Jan. 9, 1940.  J. L. ORDMAN  2,186,878
SLICING MACHINE
Filed Oct. 6, 1938  2 Sheets-Sheet 2

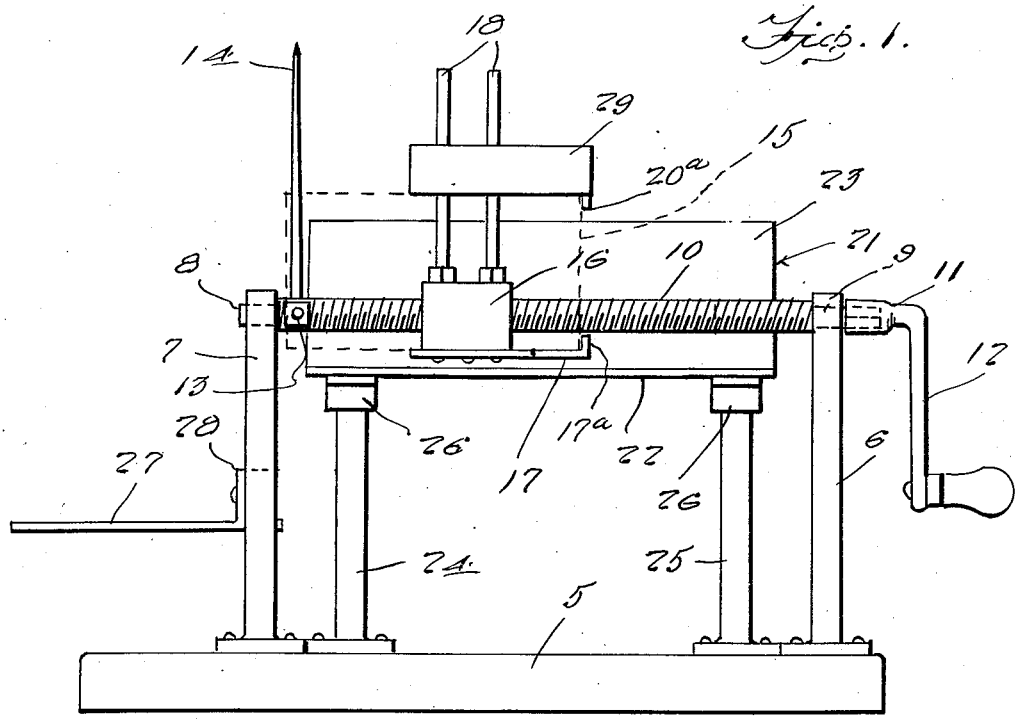
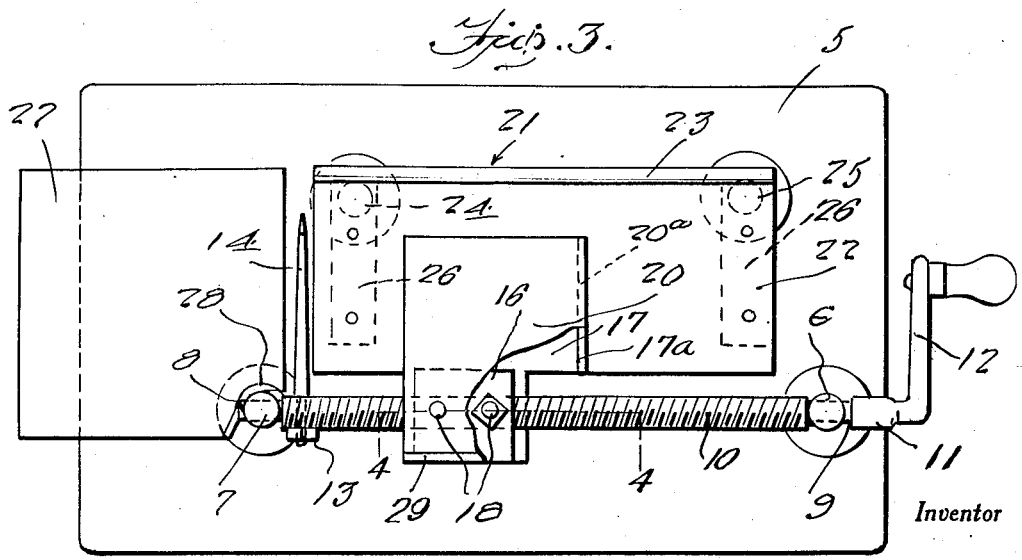

Inventor
J. L. Ordman

By Clarence A. O'Brien
and Hyman Berman
Attorneys

Patented Jan. 9, 1940

2,186,878

UNITED STATES PATENT OFFICE 2,186,878

SLICING MACHINE

Julius L. Ordman, Lemont, Ill.

Application October 6, 1938, Serial No. 233,666

2 Claims. (Cl. 146—113)

This invention relates to commodity slicing machines and has reference to a structure expressly designed to accommodate prepared food products put up in loaf form such as for example meat loaf, cheese and butter blocks and the like, and has reference in particular to a machine in this classification which feeds the loaf as each slice is progressively cut therefrom.

The prior art to which the invention relates is comparatively well developed and exhibits many different styles and forms of slicers. Therefore, in reducing to practice the principles of the preferred embodiment of the invention I utilize a special construction and adaptation of elements which mutually contribute to the production of a relatively improved and adequately perfected arrangement, this being possessed of appreciable features of refinement, economy and reliability.

In reducing to practice the preferred embodiment of the invention, I have chosen a simple supporting base, there being a stationary holder and the movable saddle thereon, a feed screw for progressively adjusting the saddle and for simultaneously carrying the loaf-slicing knife.

Other features and advantages will become readily apparent from the following description and drawings.

In the drawings:

Figure 1 is an elevational view such as may be conveniently called a side view, showing the complete structure as developed and structurally perfected in accordance with the inventive principles of this invention.

Figure 3 is a top plan view of the arrangement seen in both Figures 1 and 2.

Figure 2:
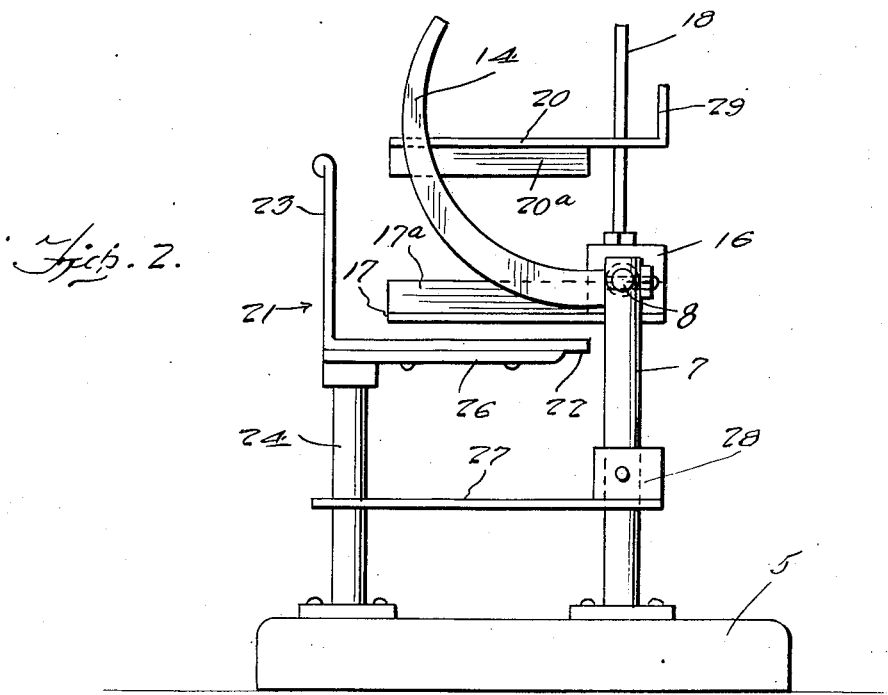
Figure 2 is an end view of the structure looking at it in a direction from left to right in Figure 1.
Figure 4:
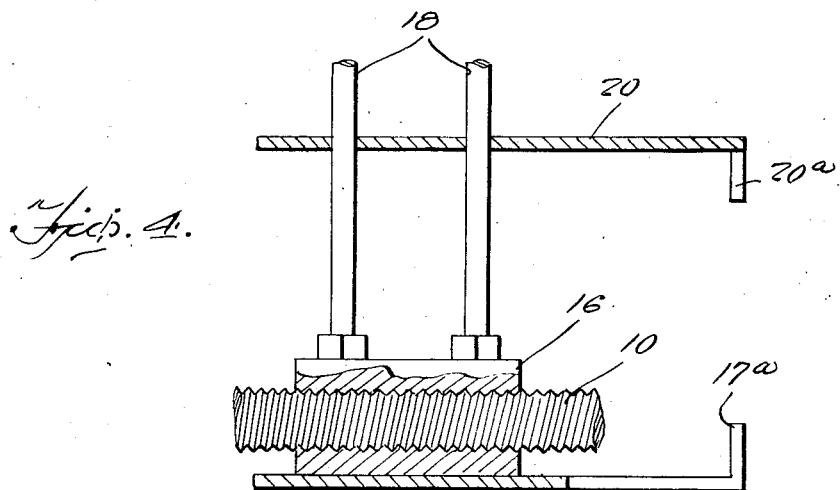
Figure 4 is an enlarged fragmentary view detailing the guide screw, the feed nut and cheese loaf supporting plate or saddle, the section being on the line 4—4 of Figure 3.

Referring now to the drawings by distinguishing reference numerals the base plate 5 is provided with a plurality of perpendicular standards. That is to say, I provide two posts or standards 6 and 7, the upper ends being provided with bearings for the journals 8 and 9 on opposite ends of the feed screw 10. At the journal end 9 is a polygonal attachment to accommodate the socket 11 of the hand crank 12. Keyed or otherwise rigidly secured, as at 13, to the opposite end of the feed screw is a suitably curved and constructed slicing knife 14. This swings or sweeps through an orbital path to sever the block of cheese 15 into slices of requisite thickness.

A carriage or adjusting nut 16 is mounted on the feed screw and this supports a horizontal plate 17 which is in effect a stirrup or saddle to support and adjust the cheese into slicing position.

It is to be observed that the feed-nut 16 is provided with a pair of upstanding retention and guide pins 18 for the stabilizing and loaf retention top feed plate 20. The plate 20 is disposed in parallelism above the saddle plate 17 so that both plates move in unison.

The shelf-like stationary rack 21 is substantially L-shaped in cross sectional form and includes a horizontal base flange 22 and an upstanding wall 23. Thus one side of the block or loaf of cheese rides slidably against this guiding and stabilizing wall 23. The supporting standards or posts 24 and 25, rising from the base, are provided with outstanding adapter arms 26 to rigidly support the rack 21 in place and in proper relation to the feed screw and clamping and carriage means.

The slice drop plate 27 overlies the base and has a flange 28 attached to the adjacent standards or post 7. Thus as each slice is cut off, it drops onto the plate 27 for convenient assembling and wrapping.

It is to be noted that the plate 20 is provided at its thrust or feeding end with a depending or drop flange 20a. Directly beneath this and rising from the saddle plate 17 is a companion flange 17a. As indicated in dotted lines in Figure 1, these two flanges engage the butt end of the block of cheese to facilitate moving it under the actuated action of the feed screw 10 and adjusting nut 16. While the plate 17 is suspended from or fastened to the nut 16, the plate 20 is freely slidable on the guide pins 18. Hence it can be raised and lowered by the upstanding flange 29 to the desired elevation. It follows that the clamping and feed unit is made up of superposed parallel flanged plates, the bottom plate being carried directly by the nut and the top plate by the pins 18 which rise from the nut. Moreover, the top plate 20 is of sufficient weight to maintain itself in the desired feeding position.

While the plate 27 is shown attached to the post 7 by a simple flange 28, it is obvious that other attaching and bracing means (not shown) may be used to stabilize this particular plate. Moreover, it is permissible under the arrangement of the invention to have the tiltable plate 17 ride in sliding contact with the underlying plate 22.

In practice, the loaf or block of cheese 15 is placed on the saddle and carrying plate 17 somewhat as indicated in dotted lines in Figure 1. The weighted clamping plate 20 drops down on the block to hold it in cutting position. One face or side of the block rides in contact with the rack vertical wall 23. Consequently, the machine is now set for operation. Allowing one end of the loaf to project beyond the rack within the path of movement of the revolving knife, it is obvious that by turning the crank and feed screw, the knife slices the cheese in desired thicknesses. As each slice is cut off the progressive feeding action of the saddle continues to feed the cheese toward the knife for the next cut.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

1. In a slicing machine of the class described, a horizontal base, vertical standards attached thereto and rising therefrom, a feed screw parallel said base and mounted for rotation on said standards, a cutting knife fastened to one end of the feed screw and disposed at right angles in relation thereto, a feed nut on said feed screw, a horizontal saddle forming plate fastened to said nut and extending at a right angle from said feed screw, said saddle plate having on one end an upstanding thrust and feeding flange, a pair of guide pins directly attached to and rising vertically from said nut and in right angular relation with respect to said saddle plate, a clamping plate slidably mounted on said pins and disposed in parallelism above said saddle plate and having a thrust flange located directly above and in companionate relation with said first named flange, and a hand crank for turning said feed screw.

2. In a slicing machine of the class described, a horizontal base, vertical standards attached thereto and rising therefrom, a feed screw mounted for rotation on said standards, a cutting knife fastened to one end of the feed screw and disposed at right angles in relation thereto, a feed nut on said feed screw, a horizontal saddle forming plate fastened to said nut and extending at a right angle from said feed screw, said saddle plate having on one end an upstanding thrust and feeding flange, a pair of guide pins directly attached to and rising vertically from said nut and in right angular relation with respect to said saddle plate, a clamping plate slidably mounted on said pins and disposed in parallelism above said saddle plate and having a thrust flange located directly above and in companionate relation with said first named flange, additional standards attached to and rising vertically from said base plate, and a rack of L-shaped cross sectional form rigidly mounted on said last named standards, said rack including a horizontal shelf underlying said saddle plate and a vertical wall opposed to the saddle plate and clamping plate in the manner and for the purposes described.

JULIUS L. ORDMAN.